Aug. 5, 1969     E. TRUCKS ETAL     3,459,978
NOISE DAMPED EXTERNAL ROTOR MOTOR WITH BALL BEARINGS
Filed Oct. 12, 1965
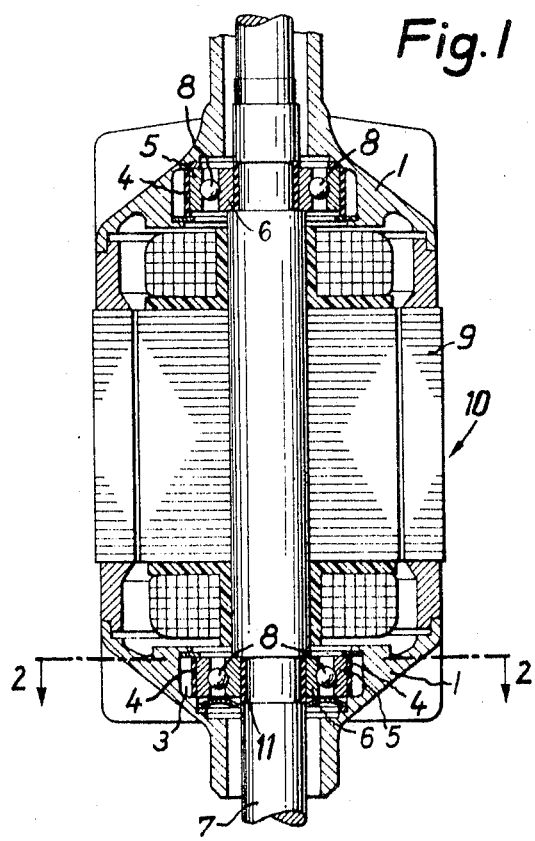
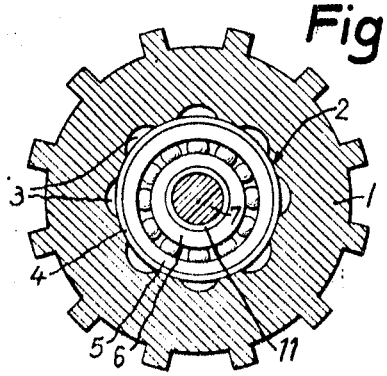
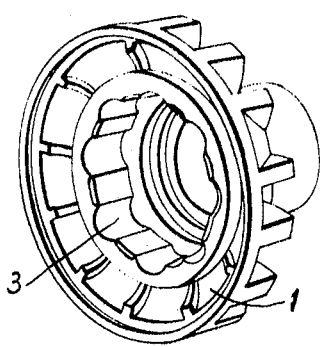
INVENTORS
Erich Trucks
Klaus Frohmüller &
Dieter Helms
BY *Spencer & Kaye*
ATTORNEYS Patented Aug. 5, 1969

3,459,978
NOISE DAMPED EXTERNAL ROTOR MOTOR WITH BALL BEARINGS
Erich Trucks, Klaus Frohmüller, and Dieter Helms, Oldenburg, Germany, assignors to Licentia Patent-Verwaltungs-G.m.b.H., Frankfurt am Main, Germany
Filed Oct. 12, 1965, Ser. No. 495,153
Claims priority, application Germany, Oct. 12, 1964, L 49,006
Int. Cl. H02k 5/24
U.S. Cl. 310—51     3 Claims

ABSTRACT OF THE DISCLOSURE

An external rotor motor suitable for use in office machines and sound reproducing equipment having at least one ball bearing rotatably supporting its rotor and a bearing plate supporting each ball bearing. The bearing plate has a bore provided with axially extending cut-outs located about the periphery of the bore. The invention includes an elastic inset interposed between each ball bearing and bearing plate for isolating the ball bearing noise.

---

The present invention relates to an electrical device, and, more particularly, to an external rotor-type motor which is of such quality as to enable it to be used in office machines and in sound reproducing equipment, i.e., a motor suitable for use, for example, in office dictating machines, noiseless typewriters, tape recorders, or the like. The characteristic which qualifies such motors to be used for this purpose is that the noise developed by it measures less than 40 phon at a distance of 10 cm.

More particularly, the present invention resides in the fact that the external rotor motor uses, instead of the heretofore customarily used slide-type bearings, ball bearings with sound damping.

Heretofore, such external rotor type motors intended for use with office machines and sound reproducing equipment were provided with slide-type bearings exclusively. Such slide-type bearings produce the least noise. Furthermore, slide-type bearings are not only inexpensive, but also relatively small so that they can readily be accommodated in the motor which, if it is to be used in compact sound reproducing equipment, has to be made as small as possible. In comparison thereto, ball bearings are substantially larger, significantly more expensive and produce more noise. Furthermore, in order to dampen the noise of ball bearings, an elastic intermediate layer has to be provided.

Nonetheless, the utilization of ball bearings brings with it a number of advantages, as will be explained below, and it is, therefore, the primary object of the present invention to provide a motor of the external rotor type which is suitable for use in sound reproducing equipment, and, with this object in view, the present invention resides basically, in the provision of such a motor which, the heretofore conventional teaching of the prior art notwithstanding, is equipped with ball bearings for rotatably supporting the rotor, there being an elastic intermediate inset for damping the noise.

Additional objects and advantages of the present invention will become apparent upon consideration of the following description when taken in conjunction with the accompanying drawings in which:

FIGURE 1 is a sectional view of an external rotor type motor according to the present invention.

FIGURE 2 is a sectional view taken on line 2—2 of FIGURE 1.

FIGURE 3 is a perspective view showing a detail of the motor bearing plate.

Referring now to the drawings, the same show a motor 10 having an external rotor 9, the latter being rotatably supported, at each end, by a ball bearing 8 and an elastic intermediate element or inset 4. Each bearing plate 1, one of which is shown in cross section in FIGURE 2, and in perspective in FIGURE 3 has cut-outs or grooves 3 arranged about the periphery of the bore 2. The intermediate inset 4 lies between the outer race 5 of the ball bearing and the bore 2. The inner race 6 of the ball bearing is carried by the shaft 7 or by a further intermediate layer 11. The inset is preferably band-shaped and may be made, for example, of rubber or an elastic plastic such as polyvinyl chloride, polyacrylate, mixed polymerizate, vinylidene fluoride and hexafluoropropylene.

The significance of the above-described structure is the following.

The characteristic mentioned in the introduction of this specification have resulted in the fact that external rotor type motors intended for use in sound reproducing equipment were heretofore made exclusively with slide-type bearings. Consequently, the development of such external rotor type motors has been influenced by this fact to such an extent that no consideration whatsoever was given to the possibility of providing the motors with anything other than slide-type bearings. The structure according to the present invention, therefore, goes directly against the teaching of the prior art, inasmuch as it was thought that equipping external rotor type motors which are intended for use in sound reproducing equipment with ball bearings would lead not only to additional expense but also to many difficulties insofar as the structure of the motor is concerned. According to the present invention, however, there is provided a bearing plate which is so configured as to accommodate the ball bearings structurally, and also so as to obtain exceptionally good vibration insulation and therefore good noise damping by means of an elastic intermediate element. According to the invention, the bearing plate is provided with the above-described axially extending cut-outs in the form of grooves or the like, which may be produced by milling, these cut-outs being distributed about the periphery of the bore and serving to receive the ball bearing and the elastic intermeditae inset. In this way, it is possible to use a hard elastic, relatively very thin intermediate layer for damping the noise of the ball bearing, and thereby to provide a motor which, though equipped with an external rotor, is of sufficiently high quality, insofar as noise is concerned, to enable the motor to be used in sound reproducing equipment. Moreover, it has been found that the noise which an external rotor type motor according to the present invention develops is no greater than, if not less than, heretofore conventional external rotor type motors equipped with slide-type bearings. But in accordance with the present invention, a number of economic and technical advantages are obtained as well. For one thing, the use of a ball bearing makes it possible to utilize a hollow shaft which can be produced by conventional manufacturing techniques. The hollow shaft used in a motor equipped with slide-type bearings requires a number of special manufacturing and handling steps, for example, such shaft requires very exact turning, surface hardening and multiple grinding, polishing or lapping, all of which steps are eliminated if the shaft is mounted not on slide-type bearings but on roller bearings. This, it will be appreciated, substantially reduces the manufacturing costs of the external rotor type motor according to the present invention.

Furthermore, it has been proven by experience that the expected trouble-free useful life of a motor incorporating ball bearings is substantially greater than a comparable motor equipped with slide-type bearings. As a practical matter, it has, rather surprisingly, been found that, in mass-production, the range of noise of the individual fractional horsepower motors is less if the motor is equipped with ball-type bearings than in the case of external rotor type motors whose rotor is supported by slide-type bearings.

Moreover, the external rotor type motor according to the present invention yields a constant motor torque. In contradistinction thereto, external rotor type motors incorporating slide-type bearings are temperature sensitive in that the motor torque varies as a function of temperature. Also, the frictional losses of the motor, when subjected to a radial load, is substantially less in the case of the motor equipped with ball-type bearings than in the case of motors equipped with slide-type bearings.

Furthermore, the external rotor type motor according to the present invention has been found to yield a higher power rating than a comparable motor of the same size, but equipped with slide-type bearings. This advantage is of tremendous significance, particularly when the motor is used for office equipment such as typewriters and desk calculators.

Moreover, the external rotor type motor according to the present invention has been found to have less axial rotor play as compared to external rotor type motors whose rotor is supported in slide-type bearings, so that the motor according to the present invention is advantageous over prior art motors in the respect as well.

It will thus be seen that the present invention, which is the result of overcoming the prejudice which heretofore has prevailed against the use of ball bearings insofar as external rotor type motors of tone quality are concerned, is capable of producing a larger number of advantageous results incapable of being achieved by external rotor type motors which, being intended for use in sound reproducing equipment, are equipped with slide-type bearings.

It will be understood that the above description of the present invention is susceptible to various modifications, changes and adaptations, and the same are intended to be comprehended within the meaning and range of equivalents of the appended claims.

What is claimed is:

1. In a motor having such noise characteristics as to enable it to be used in sound reproducing equipment and in office machines, the combination which comprises:
   (a) a bearing plate having a cylindrical bore and axially extending cut-outs, distributed about the periphery of said bore;
   (b) ball bearing means carried by said bearing plate in said bore; and
   (c) elastic inset means interposed in said more between said bearing plate and said ball bearing means for damping the noise.

2. The combination defined in claim 1 wherein said inset means are band-shaped.

3. The combination defined in claim 1 wherein said inset means extends throughout the axial length of said ball bearing means.

References Cited
UNITED STATES PATENTS

| | | | |
|---|---|---|---|
| 1,579,798 | 4/1926 | Vail | 310—90 X |
| 3,107,946 | 10/1963 | Drake | 308—26 X |
| 1,641,091 | 8/1927 | Minck | 310—51 X |
| 2,238,435 | 4/1941 | Perry | 310—51 X |
| 2,682,617 | 6/1954 | Reich et al. | 310—67 |
| 2,929,944 | 3/1960 | Shewmon | 310—67 |
| 3,253,170 | 5/1966 | Phillips et al. | 310—51 X |

WARREN E. RAY, Primary Examiner

U.S. Cl. X.R.

310—90